US011267735B1

(12) United States Patent
Kellgren et al.

(10) Patent No.: US 11,267,735 B1
(45) Date of Patent: Mar. 8, 2022

(54) CIRCULATION PUMP FOR VERTICALLY CIRCULATING WATER IN BODIES OF WATER USING CONSECUTIVE EXPANDING SUPER AIR BUBBLES

(71) Applicants: Jerry Kellgren, Cape Coral, FL (US); John Kellgren, Brewton, AL (US)

(72) Inventors: Jerry Kellgren, Cape Coral, FL (US); John Kellgren, Brewton, AL (US)

(73) Assignee: Kellgren Group, Inc., Brewton, AL (US)

( * ) Notice: Subject to any disclaimer, the term of this patent is extended or adjusted under 35 U.S.C. 154(b) by 0 days.

(21) Appl. No.: 17/403,151

(22) Filed: Aug. 16, 2021

Related U.S. Application Data

(60) Provisional application No. 63/075,253, filed on Sep. 7, 2020.

(51) Int. Cl.
| | |
|---|---|
| *C02F 3/16* | (2006.01) |
| *C02F 3/20* | (2006.01) |
| *C02F 3/22* | (2006.01) |
| *B01F 3/04* | (2006.01) |
| *C02F 7/00* | (2006.01) |
| *C02F 103/00* | (2006.01) |

(52) U.S. Cl.
CPC .......... *C02F 3/165* (2013.01); *B01F 3/04241* (2013.01); *C02F 3/201* (2013.01); *C02F 3/223* (2013.01); *C02F 7/00* (2013.01); *B01F 2003/04319* (2013.01); *C02F 2103/007* (2013.01)

(58) Field of Classification Search
None
See application file for complete search history.

(56) References Cited

U.S. PATENT DOCUMENTS

| | | | | |
|---|---|---|---|---|
| 3,969,446 | A | 7/1976 | Franklin, Jr. | |
| 4,051,035 | A * | 9/1977 | Boschen | C02F 3/20 210/220 |
| 4,752,421 | A * | 6/1988 | Makino | B01F 3/0451 261/77 |
| 6,017,020 | A | 1/2000 | Baughman | |
| 6,558,220 | B1 * | 5/2003 | Kadoshima | A63H 33/28 446/15 |
| 7,731,337 | B2 * | 6/2010 | Kang | B41J 2/1646 347/62 |
| 8,561,890 | B2 * | 10/2013 | Godager | G06Q 30/00 235/379 |

(Continued)

OTHER PUBLICATIONS

"Ponds" Wikipedia article available as early as Jan. 9, 2020 (by internet archive "wayback machine"), downloaded Oct. 18, 2021. (Year: 2020).*

*Primary Examiner* — Chester T Barry
(74) *Attorney, Agent, or Firm* — Joel Douglas

(57) ABSTRACT

The invention in one form is directed to an airlift pump that is optimized to transfer large volumes of water using very low pumping head. Specifically, the airlift pump is comprised of a pump inlet and outlet which are both located below pond's surface. The pumping force driving the water flow is supplied by the weight of the volume of water displaced by pressurized air into a vertical pipe, and this energy is dissipated by the friction of the rising bubbles pipe entrance head, plus the frictional effects of the inner pipe wall and the energy contained in the water's exit velocity.

14 Claims, 12 Drawing Sheets

(56) References Cited

U.S. PATENT DOCUMENTS

| | | | | |
|---|---|---|---|---|
| 10,752,530 B1* | 8/2020 | Dartez | ............... | B01F 5/0606 |
| 10,843,140 B2 | 11/2020 | Burton et al. | | |
| 2008/0286851 A1* | 11/2008 | Whitton | ............... | C12M 21/02 |
| | | | | 435/243 |

* cited by examiner

PRIOR ART

CIRCULATION PUMP FOR VERTICALLY CIRCULATING WATER IN BODIES OF WATER USING CONSECUTIVE EXPANDING SUPER AIR BUBBLES

CROSS-REFERENCE TO RELATED APPLICATION

This application claims priority from U.S. Provisional Patent application 63/075,253 filed on Sep. 7, 2020, which is hereby incorporated by reference herein for all purposes.

COPYRIGHT STATEMENT

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

Trademarks used in the disclosure of the invention and the applicants make no claim to any trademarks referenced.

BACKGROUND OF THE INVENTION

1) Field of the Invention

The invention relates to the field of sub-surface aeration systems for lakes, ponds, and other forms of water storage.

2) Description of Related Art

Currently the state of the art includes methods to increase the oxygen uptake per hectare of pond area to artificially increase the water's surface area by agitation or by spraying water into the air. While effective, this is limited in its efficiency because surface waters used in the process are already close to maximum oxygen saturation, and the droplets have limited surface area. Typically, these processes result in the aerobic biological activity restricted predominately to the surface waters, in the upper 0.5 meters, and the oxygen concentrations typically decrease rapidly with increasing depth.

These methods include various techniques for aeration of ponds and lakes which include the following:
 a. Waterfall;
 b. Venturi eductor nozzle;
 c. Degassing towers; and
 d. Air lift pumps.

The waterfall can be an aesthetic form of aeration if it is very turbulent in design. The more splashing the better. A longer waterfall with many splash points will give greater benefits than a short one with few splash points. A stream bed incorporated into a waterfall will give a longer contact time with the atmosphere for increasing the dissolved oxygen in the water. A waterfall which simply sheets over one drop before hitting the pond surface does little for aeration. A waterfall as the main source of aeration is expensive to run due to the power required to run the water pump.

Venturi eductor nozzles can be added to the outlet pipes of your water pump as a jet retuning to the pond. They are positioned near the surface and as water is pumped through the nozzle air is drawn into the flow of water to form small bubbles before being pumped out into the pond. This creates surface turbulence and subsurface absorption of air bubbles. These can add oxygen if the pump is powerful enough. For the venturi eductor nozzle to work properly a lot of air laden water must be forced through piping back into the pond. This puts tremendous back pressure on your water pump. However, the gains in aeration are offset by loss in water pressure. The tradeoff is higher electric bills to power a bigger pump to compensate for loss in water flow of the technology.

Degassing towers otherwise known as trickle towers can be used to aerate water or de-gas unwanted gases from the water. Water is pumped up to a column or tower and sprayed down over plastic or natural material called "packing" which breaks up the water many times as it splashes down through the material. This vigorously aerates the water and allows bad gases to be released. To be effective this device needs to be quite tall. There is also considerable electric cost to pump the water to sufficient height.

Current air lift pumps provide a system which utilizes less power than the other alternatives, but they do not achieve the necessary levels of dissolved oxygen needed. The current fine bubble aeration systems are efficient at saturating vertical columns of water in a lake or pond. The fine bubbles created by the diffusers absorb little or no oxygen at the water/atmosphere interface and result in limited circulation of the water. Therefore, the greatest concentration of dissolved air (approximately 18% dissolved oxygen) is found around the diffuser itself. These air lift pumps produce columns of aerated water which will slowly diffuse throughout the lake via underwater currents caused by the wind moving the surface water. While the air lift pump is more economical to run the dissolved oxygen, the rate is low.

Alternatively, a variety of systems have been designed to take water from the lower depths of the pond and pump it to the surface. The systems need to be carefully designed and started so as to not disturb the necessary stratification containing the anaerobic biological process. Pumping the water to the surface from the bottom of the pond's anaerobic layer works because the deeper colder water is virtually devoid of free oxygen. Even without spraying it into the air, the action of simply spreading it on the surface allows wind and gentle wave action to provide an effective exchange mechanism. Thus, the principle here is to improve gas exchange rates by exposing colder low oxygen water to air such that the difference in partial pressure is maximized and the amount of dissolved oxygen in the water is increased.

However, the power required to operate the pumping systems of the current technologies is significant and results in operators limiting the time the pumps are used.

Therefore, what is needed in the art is a system that can elevate the dissolved oxygen levels throughout the water of a pond or body of water while minimizing the power consumed by the pumping mechanism.

BRIEF SUMMARY OF THE INVENTION

The invention in one form is directed to an airlift air lift pump that is optimized to lift large volumes of water using very low pumping head and very low amount of energy. Specifically, the air lift pump is comprised of an inlet and an outlet which are both located below the pond's surface. The pumping force driving the water flow is supplied by the weight of the volume of water displaced by pressurized air flowing uniformly into a vertical pipe. This energy is then dissipated by the friction of the rising bubbles pipe entrance head and the frictional effects of the inner pipe wall and the energy contained in the water's exit velocity.

Another advantage of the air lift pump of the instant invention is the reduced power consumption to achieve high aeration rates of dissolved oxygen levels in the water.

BRIEF DESCRIPTION OF THE DRAWINGS

A further understanding of the nature and advantages of particular embodiments may be realized by reference to the remaining portions of the specification and the drawings, in which like reference numerals are used to refer to similar components. When reference is made to a reference numeral without specification to an existing sub-label, it is intended to refer to all such multiple similar components.

Corresponding reference characters indicate corresponding parts throughout the several views. The exemplifications set out herein illustrate embodiments of the invention and such exemplifications are not to be construed as limiting the scope of the invention in any manner.

DETAILED DESCRIPTION

Figure 1:
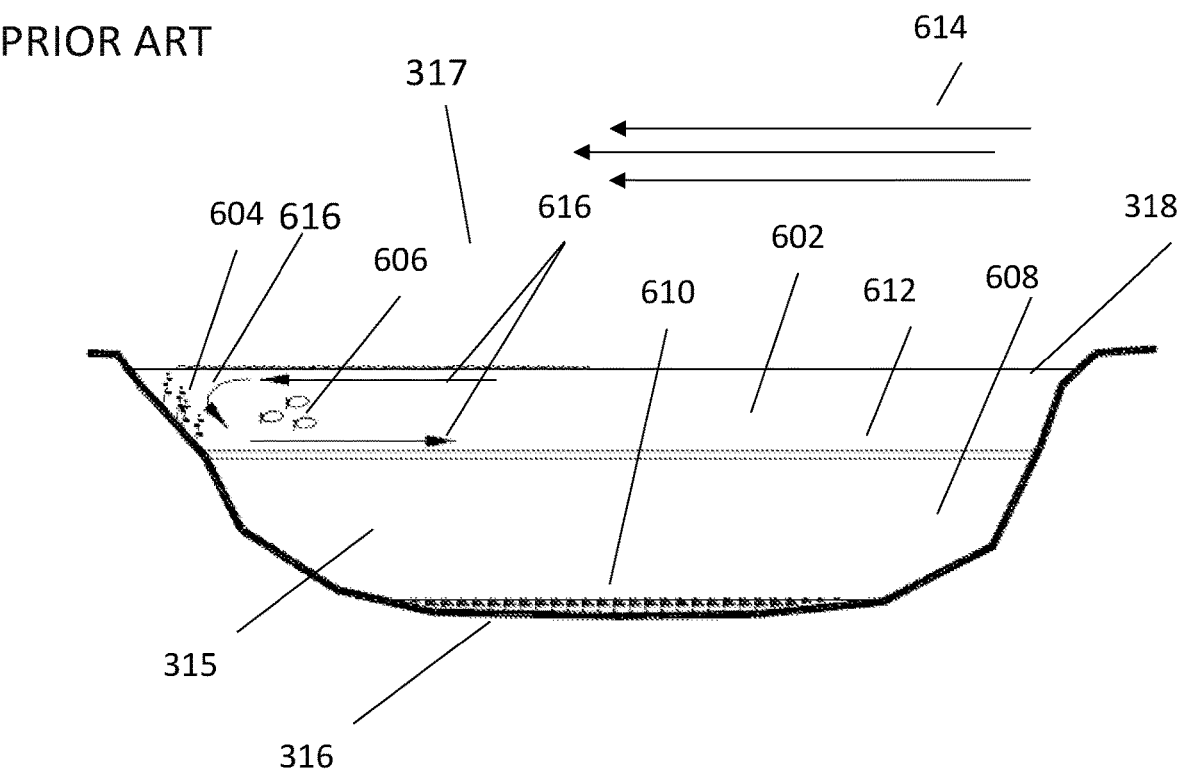
FIG. 1 shows a body of water without mechanical aeration.

While various aspects and features of certain embodiments have been summarized above, the following detailed description illustrates a few exemplary embodiments in further detail to enable one skilled in the art to practice such embodiments. The described examples are provided for illustrative purposes and are not intended to limit the scope of the invention.

In the following description, for the purposes of explanation, numerous specific details are set forth to provide a thorough understanding of the described embodiments. It will be apparent to one skilled in the art; however, that other embodiments of the present invention may be practiced without some of these specific details. Several embodiments are described herein, and while various features are ascribed to different embodiments, it should be appreciated that the features described with respect to one embodiment may be incorporated with other embodiments as well. By the same token, no single feature or features of any described embodiment should be considered essential to every embodiment of the invention as other embodiments of the invention may omit such features.

In this application the use of the singular includes the plural unless specifically stated otherwise and use of the terms "and" and "or" is equivalent to "and/or," also referred to as "non-exclusive or" unless otherwise indicated. Moreover, the use of the term "including," as well as other forms, such as "includes" and "included," should be considered non-exclusive. Also, terms such as "element" or "component" encompass both elements and components including one unit and elements and components that include more than one unit unless specifically stated otherwise.

Lastly, the terms "or" and "and/or" as used herein are to be interpreted as inclusive or meaning any one or any combination. Therefore, "A, B or C" or "A, B and/or C" mean "any of the following: A; B; C; A and B; A and C; B and C; A, B and C." An exception to this definition will occur only when a combination of elements, functions, steps or acts are in some way inherently mutually exclusive.

As this invention is susceptible to embodiments of many different forms, it is intended that the present disclosure be considered as an example of the principles of the invention and not intended to limit the invention to the specific embodiments shown and described.

The terms big bubble circulator as used in the specification is meant to mean a device that releases air below the surface of the water.

The terms person, people, individual and employee are used interchangeably to mean a person who is using the big bubble circulator.

As discussed, the problem of aeration of ponds has existed and the lack of aeration can result in stagnant water. Due to the plant and fish life in ponds and lakes, they accumulate a layer of organic material on the bottom that needs oxygen to decay. However, due to the size of the ponds and lakes the ability to oxygenate the water is limited. This problem is made more acute when the pond or lake is subject to freezing and are covered with snow. This prevents the pond or lake from absorbing fresh oxygen from the surface or from utilizing photosynthesis. Eventually the water in the pond or lake is depleted of oxygen by the decaying organic material which results in low oxygenated water that cannot support life. The pond can then become an anaerobic pond that lacks oxygen and encourages the growth of algae and anaerobic bacteria. The resulting algae and anaerobic bacteria can break down the organic materials without dissolved oxygen and result in unpleasant odors.

Therefore, pond owners initially developed a series of aeration devices. The first of these devices was a waterproof electric motor with an impeller attached to a dock or floating structure. The electric motor was suspended about 5 feet below the surface of the pond or lake and pointed upward towards the surface. The impeller circulated the water upward and the movement of lower water created a zone of circulation. Low oxygen water would pass across the surface of the pond and absorb oxygen from the atmosphere before sinking back into the lake or pond. This infusion of oxygen enabled fish to thrive in the circulated areas of the pond or lake.

The next advancement used a land-based compressor to supply air through a hose to a pipe on the bottom with hundreds of small holes that created coarse bubbles (<2 cm). This advancement eliminated the need for a submerged electric motor and instead used rising bubbles to lift water to the surface and create circulation across surface of the lake or pond. This was the start of modern-day sub-surface aeration.

In the late 1960's and early 1970's engineered plastics were developed that created extremely small bubbles. These plastics were made into hoses and sheets. When compressed air is forced through engineered plastic hose extremely fine bubbles (<1 mm) are formed. The engineered plastic sheet and hose material is used to make diffusers that emit extremely small bubbles when compressed air is injected. These engineered plastics have improved over the years so that they rarely plug. Todays engineered plastics make bubbles so small that they barely float and dissolve almost as fast as they form in open water. As the technology progressed the type and ability to dissolve air in the pond was enhanced however the solutions all required significant energy input to achieve adequate dissolved oxygen in the pond or lake water.

Therefore, the prior art does not provide for a low energy system which can effectively aerate a body of water. The current methods include waterfall-venturi nozzle, degassing towers and air lift pumps. They all require significant amounts of power to efficiently aerate any body of water. Aeration is the process of charging a liquid with a gas.

FIG. 1 depicts a cross section of a body of water 315 with a surface of body of water 318 and a bottom of body of water 316. This type of body of water is typical of the prior art. These bodies of fresh water, depending on their depth, have three distinct zones formed because of the physical properties of water. The upper zone is called the epilimnion 602 which contains less dense warm water that absorbs oxygen from the atmosphere as the wind 614 moves across the surface of the lake and down the far side creating circulation 616 of the epilimnion 602. Additional oxygen is added to the epilimnion 602 from living plants 604 using the sun for photosynthesis. Most fish 606 live in this layer where the dissolved oxygen is 3 to 6 ppm. The lower zone is called the hypolimnion 608 which contains cold dense water. The hypolimnion 608 also contains any decaying organic material 610 from living plants 604 or fish 606 that died resulting in the use of available oxygen. This layer typically has less than 3 ppm dissolved oxygen and does not support fish 606. Between the warmer epilimnion 602 and the colder hypolimnion 608 is a zone called the thermocline 612 which varies in temperature and thickness throughout the year.

The epilimnion or surface layer is the top-most layer in a thermally stratified lake. It sits above the deeper metalimnion and hypolimnion. It is typically warmer and has a higher pH and higher dissolved oxygen concentration than the hypolimnion. The hypolimnion or under lake is the dense, bottom layer of water in a thermally stratified lake. The word hypolimnion is derived from the Greek "limnos" meaning "lake". It is the layer that lies below the thermocline. [[ . . . ]] The hypolimnion may be much warmer in lakes at warmer latitudes.

Figure 2:
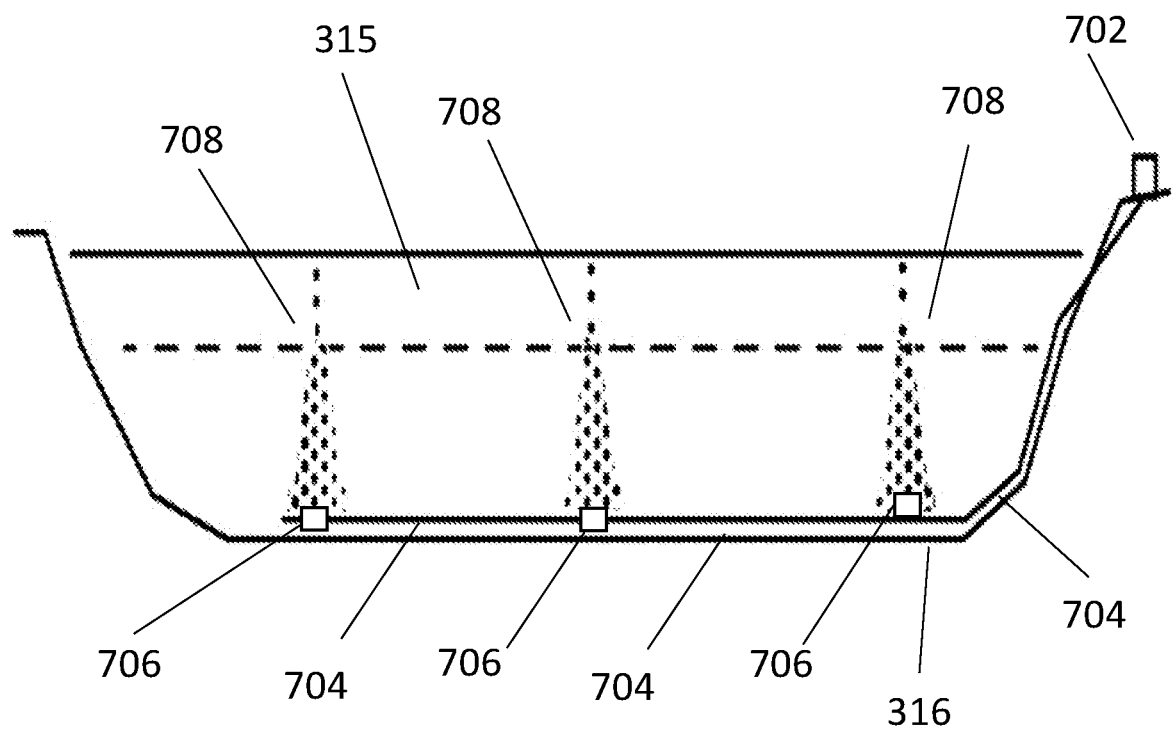
FIG. 2 shows a body of water with small bubble aeration.

Referring to FIG. 2 which shows a typical aeration system of the prior art that uses compressor air to aerate a body of water 315 such as a pond or lake. The compressor station 702 utilizes weighted air lines 704 between the compressor station 702 and fine-bubble diffusers 706 which generate the bubbles. The fine bubble diffusers 706 on the bottom of body of water 316 make extremely small bubbles that rise slowly and dissolve from 90% to 100% into the lake or pond. This results in a bubble column 708. However, the amount of power needed to run the compressor station 702 to deliver the amount of air required to increase and maintain the dissolved oxygen is significant.

Additionally, the current fine bubble diffuser systems claim a cold water lifting rate from the diffusers to the surface that is more than 2,000 gallons per minute using just 1 standard cubic foot of compressed air at 20 feet of depth. However, the bubbles flowing from the diffuser on the bottom are dissolving into the water at a rate of 90% to 100%. If the bubbles are dissolved, they cannot be lifting water from the bottom to the surface to deliver and aerate the water which sets up a circulation flow in the pond and combats the probability of anaerobic conditions in the pond or lake. Without the water being lifted from the bottom the bottom can form an anaerobic system and the nutrients located on the bottom will not be distributed within the epilimnion 602 where they can be used by plants and aquatic life such as fish.

Further testing has shown that 50% of the bubbles in the open water dissolve as fast as they are formed. In fact, if the body of water is 30 feet deep or more, barely 5% of the bubbles will make it to the surface and of those bubbles only the ones that have combined to make larger bubbles will survive and lift water to the top of the bubble column 708.

Referring to the bodies of water in FIG. 1, FIG. 3 FIG. 8 and FIG. 12, adding a big bubble circulator 100 to any new or existing fine bubble aeration system to create a large vertical circulation of cold low oxygen water from the bottom of body of water 316 to the surface of body of water 318 forming a mound of water 302, where the colder low oxygen water flows across the surface 318 absorbing atmospheric oxygen 317. The process can also be used for keeping ice from forming before sinking back into the warmer surface water. This was a giant step forward for the process of aeration of water bodies. The oxygenated water 308 which is flowing across the surface absorbing oxygen will eventually sink. However, before sinking back into the body of water 315 the water absorbs more oxygen due to exposure of the oxygen at the surface of the body of water 315. This is where the water absorbs atmospheric oxygen 317. The air is injected into the system by the compressor station 702. This action of cold-water mounding at the surface and flowing out until it slows down and sinks back into the lake across the entire surface creates downward flow. The sinking water across the surface and the spinning of the earth creates the rotating zone of oxygenated water in the shape of a tornado from the bubble generator to the surface. The flow of air from the compressor station 702 through the individual weighted air lines 704 to diffusers 706 which generate the bubbles is set at sixty percent of the flow recommended by the diffuser manufacturers to assure that all the bubbles emitted dissolve in or below the thermocline 612. The remainder of the air available from the compressor station(s) 702 is divided evenly to any big bubble circulator(s) 100 in the system. The existing fine bubble aeration system produces fine bubbles from diffuser 502 which dissolve into the water therefore the user gains the benefits of the fine bubbles from diffuser and the uplift of the super bubbles 202.

Figure 3:
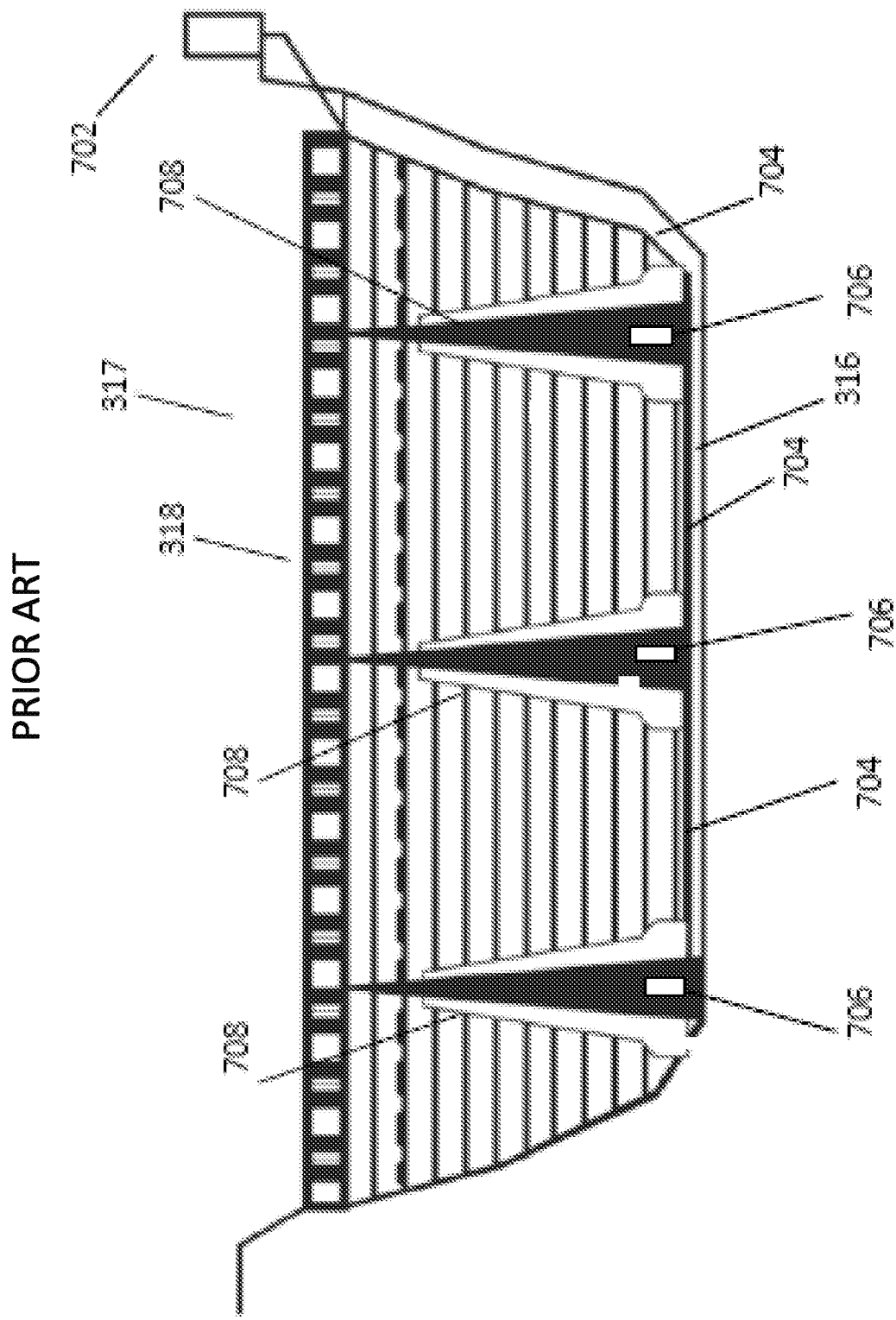
FIG. 3 depicts the dissolved oxygen levels in an operating small bubble diffuser system.
Figure 4:
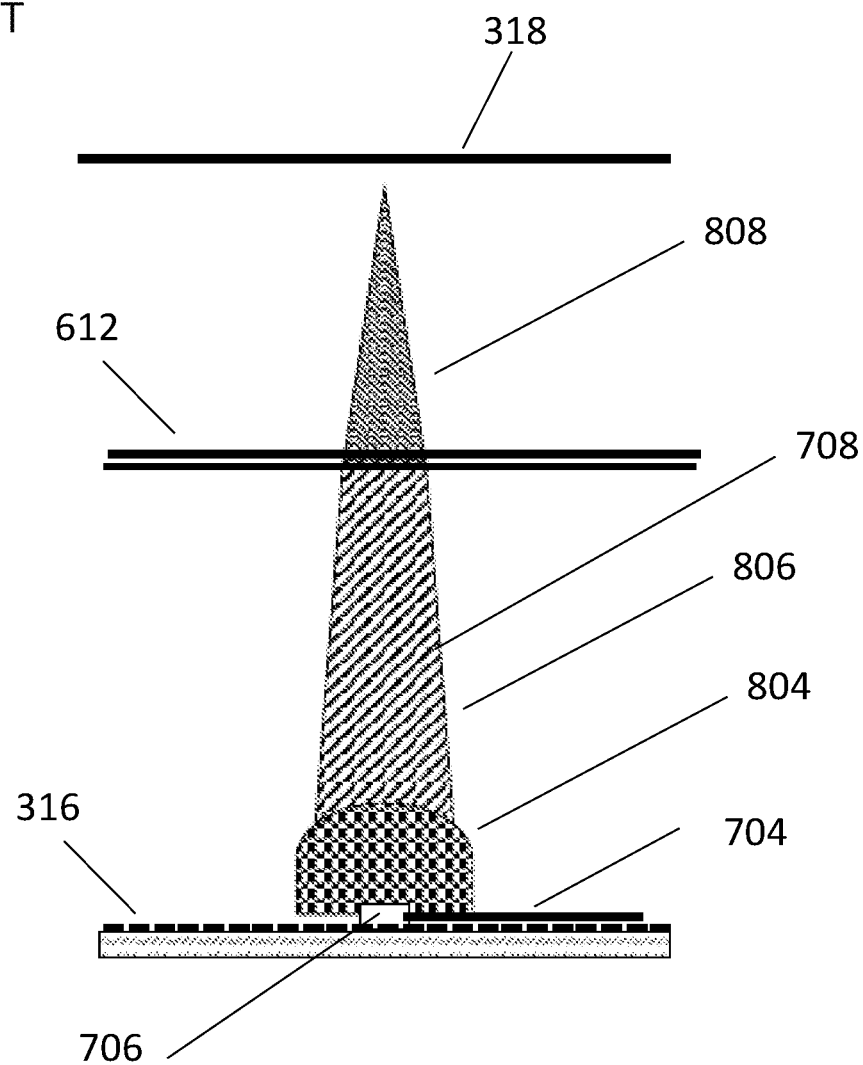
FIG. 4 depicts the column of bubbles and aerated water formed by an operating diffuser.
Figure 5:
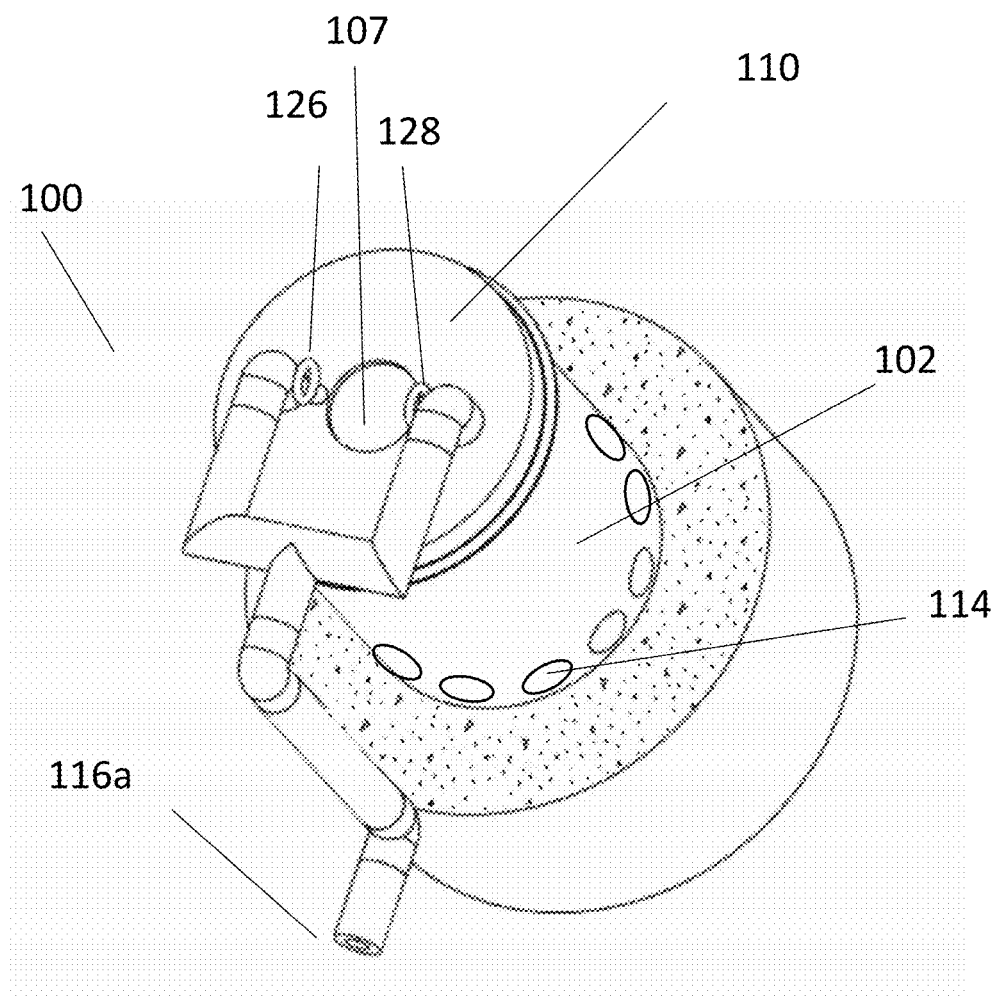
FIG. 5 is an isometric plan view of the big bubble circulator.
Figure 6:
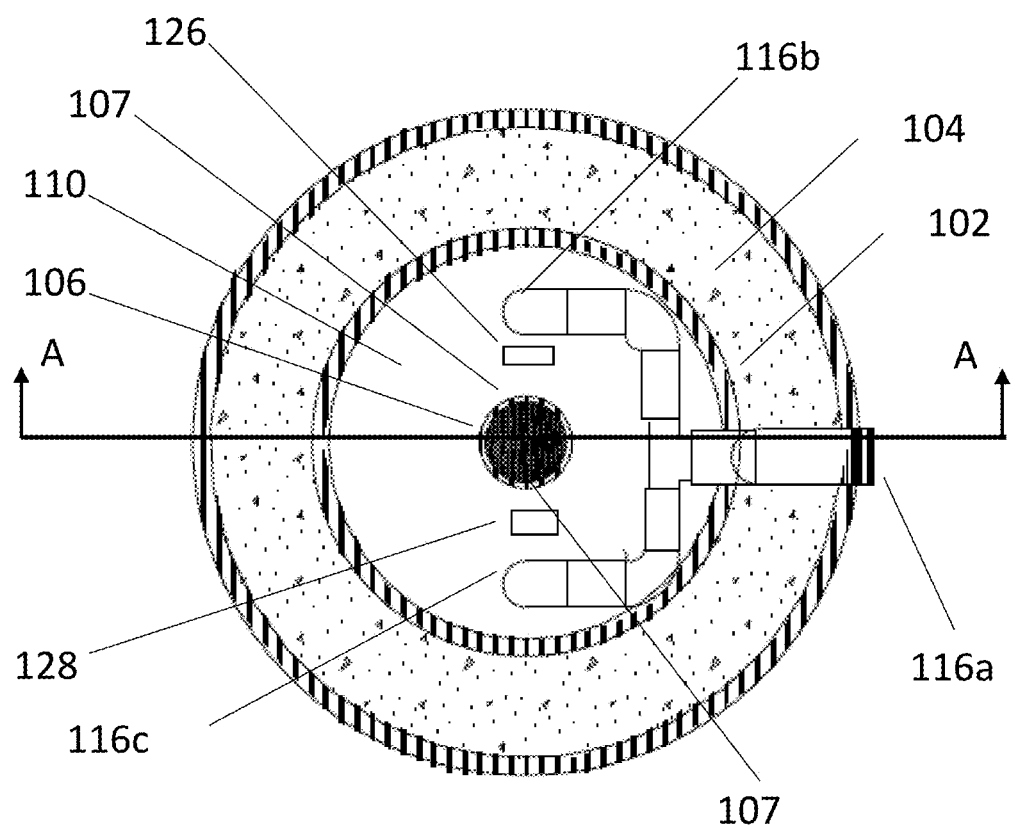
FIG. 6 is a plan view of the big bubble circulator.
Figure 7:
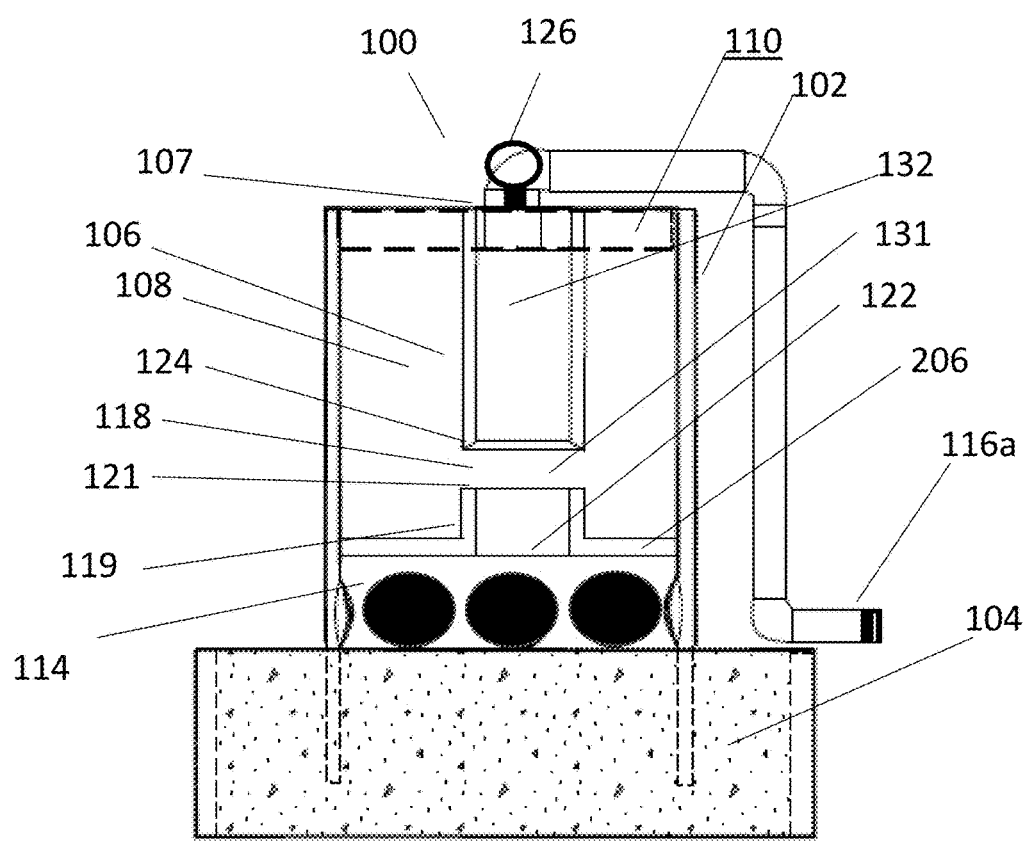
FIG. 7 is a cross section view through section A-A of the big bubble circulator without water in the big bubble circulator.

Referring to FIGS. 3 and 4 which is typical of the prior art shows what happens in an open body of water when a small bubble diffuser is operating. The bottom of body of water 316 is where bubble zone 1 804 is in the bubble column 708, which is also called the diffuser zone, is about 5 feet tall and forms above the operating fine bubble diffuser 706. This zone looks like thick smoke because the swirling bubble mass does not allow light to pass through. In this zone about 50% of fine bubbles are forming and dissolving immediately into the open water. The other 50% of fine bubbles are combining to form larger bubbles that start to rise.

Describing the typical problems found with the prior art. Bubble zone 2 806 which is directly above bubble zone 2 now looks like a column of coarse bubbles that is much less dense than below in the diffuser zone. The mass of rising bubbles in bubble zone 2 806 is now approximately 20% fine bubbles and 80% coarse bubbles. This zone is usually 5 to 10 feet long with light now passing through the moving cluster of bubbles. This zone's water is partially saturated with air causing the bubbles to dissolve slower than the bubble zone 1 804. These bubbles continue combining to form larger bubbles which expand and continue to rise faster.

Describing the typical problems found with the prior art. As shown in FIG. 4 the bubble zone 3 808 starts at approximately 15 to 20 feet above the diffuser zone and goes to the surface if the lake is shallow enough. Bubble zone 3 808 consists of coarse bubbles or larger. Light easily passes through the rising column and the individual coarse bubbles continue to expand and rise towards the surface. Over 90% of the initial bubbles have dissolved into the open body of water as they passed through the first two zones. Keeping in mind that dissolved bubbles do not lift water, the amount of water raised from the bottom of the pond is not a significant part of the bubble column. Once again, this water cannot absorb oxygen from the atmosphere because it is already saturated with air.

The modern fine bubble aeration systems of the prior art are very efficient at aerating vertical columns of water in a lake or pond. Unfortunately, the fine bubble diffusers absorb little or no oxygen at the water/atmosphere interface and there is limited circulation. The majority of the resulting circulation occurs at the diffuser itself. These columns of aerated water will slowly diffuse throughout the lake via underwater currents caused when the wind 614 is moving the surface. However, this is a slow process and does not fully aerate or move water from the bottom to the top of the pond or lake.

To overcome the inefficiencies of the current process the instant invention introduces the concept of a big bubble circulator.

While this invention is described with a preferred embodiment shown in the drawings, and will be described herein in detail, specific embodiments thereof with the understanding that the present disclosure is to be considered as an exemplification of the principles of the invention and is not intended to limit the invention to the specific embodiments illustrated.

Referring to FIG. 1-11 and more specifically to FIG. 5, FIG. 6, FIG. 7, FIG. 8 and FIG. 11 the big bubble circulator of the instant invention is more fully described.

Figure 8:
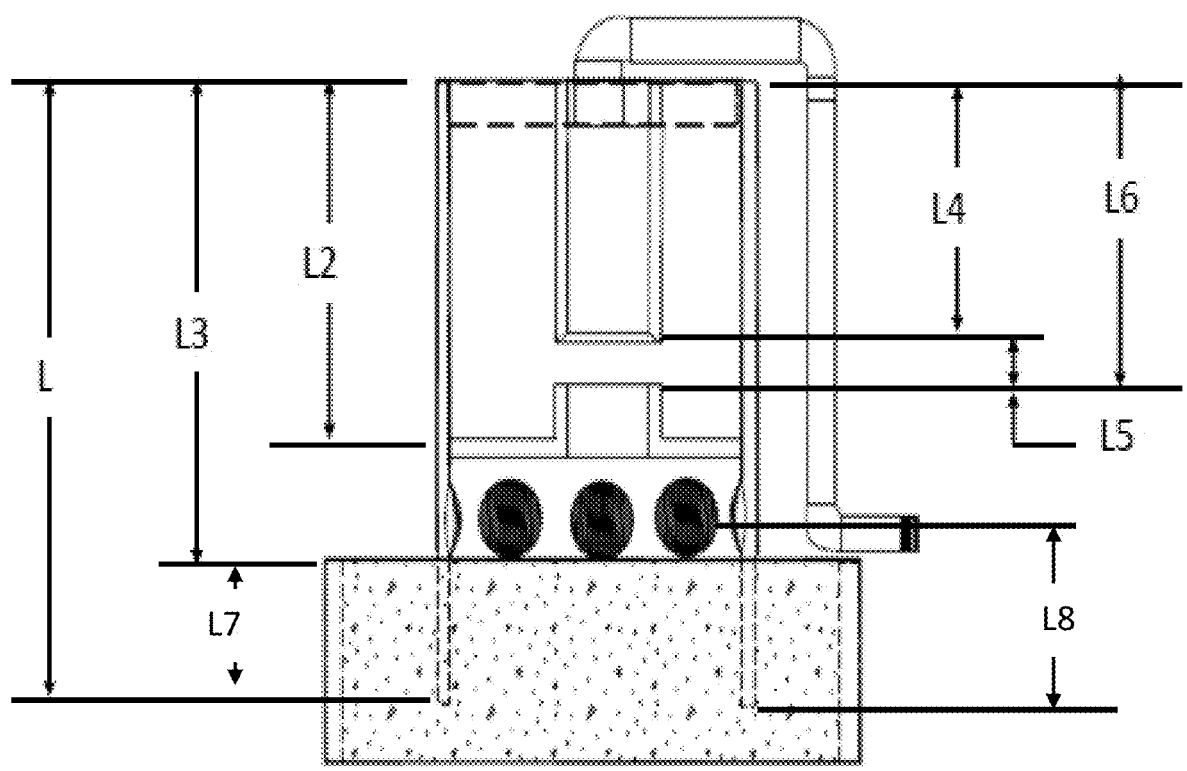
FIG. 8 is a cross section view through section A-A of the big bubble circulator without water in the big bubble circulator showing reference dimension.
Figure 11:
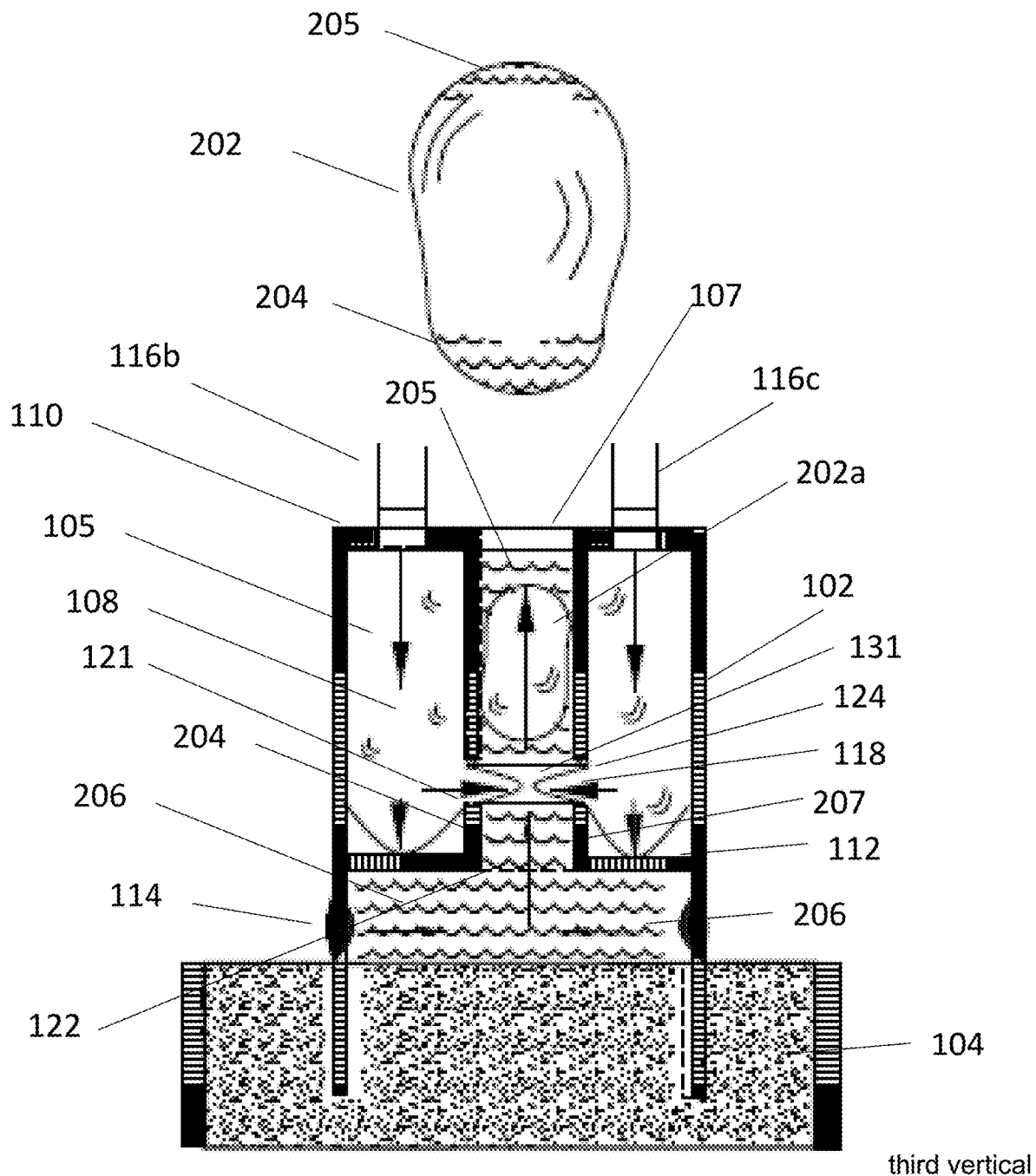
FIG. 11 is a cross section view through section A-A of the big bubble circulator with water in the big bubble circulator.

FIG. 5, FIG. 6, FIG. 7, FIG. 8 and FIG. 11 show views of the big bubble circulator 100 located on the bottom of body of water 316 shown in FIG. 11. The big bubble circulator 100 can be made of most metals or rigid plastics resistant to degradation from salt or fresh water. The big bubble circulator 100 is scalable and can be made any size if the proportions remain constant. The dimension of the second vertical tube 106 is based on the diameter of the super bubble 202 shown in FIG. 11. The second vertical tube 106 having a vertical tube wall formed by a vertical tube interior and a vertical tube exterior, a vertical tube proximal end and a vertical tube distal end (facing the pond surface). The diameter of the upper open end of the second vertical tube 106 is second vertical tube hole 107 which equals hole 122 and it is approximately one inch smaller than the anticipated super bubble 202 to be produced by the big bubble circulator 100. The first vertical tube 102 has a minimum diameter of three times the diameter of the second vertical tube 106. The first vertical tube 102 has an open upper end and a lower end encased in enough ballast or concrete 104 to overcome the buoyancy of the big bubble circulator 100 in water. The first vertical tube 102 has a tubular wall extending from said upper end to said lower end, a longitudinal axis, and an inner diameter. The minimum length of the first vertical tube 102 above the ballast or concrete 104 is three times the diameter of the first vertical tube 102 as shown in FIG. 8 dimension L3. The length overall length of the first vertical tube is L=L3+L7.

The big bubble circulator 100 in FIG. 5, FIG. 6, FIG. 7, FIG. 8 and FIG. 11 has an upper end plate 110 that is annular in construction and has a proximal side and a distal side and a hole 107 central to the upper end plate 110. The hole 107 is selected such that it is capable of forming a super bubble after the super bubble leaves the big bubble circulator 100. The dimension of hole 107 is from $\frac{1}{10}$ to $\frac{1}{3}$ the diameter of the first vertical tube 102. A second vertical tube 106 is attached at the center of the upper end plate 110 and aligned with the hole 107 in the upper end plate 110 such that the hole 107 is aligned with the hole form in the second vertical tube 106. The second vertical tube 106 extends into the first vertical tube 102 towards the proximal end of the first vertical tube 102. The second vertical tube 106 can be attached to the upper end plate 110 by any means so that it forms an airtight seal and typical methods include welding, adhesive and mechanical seals with the appropriate gasket. The longitudinal axis second vertical tube 106 is parallel to the axis of the first vertical tube 102. The upper end of the second vertical tube 106 is level with the upper end of the first vertical tube 102. A lower endplate 112 having a proximal and distal side and with an annulus shape and hole 122 fits in the radial direction between the inner wall of the first vertical tube 102 and the outer surface of the second vertical tube 106 such that the proximal side faces the proximal end of the first vertical tube 102. The lower endplate 112 requires a minimum thickness of one eighth the diameter of the second vertical tube 106. The proximal or bottom end of the lower endplate 112 is attached to the inside of the first vertical tube 102 such that it is $\frac{2}{3}$ the distance L (as shown in FIG. 8 dimension L2) from the proximal end of the first vertical tube 102 and bonded around the entire circumference at the points where the lower endplate 112 contacts the first vertical tube 102. A third vertical tube 119 is attached to the lower endplate 112 distal side such that the third vertical tube 119 is aligned with the hole 122 in the end lower end plate 112 and the third vertical tube extends into the first vertical tube 102 towards the distal end of the first vertical tube 102. Second chamber 131 is formed between the proximal end of the second vertical tube 106 and the distal end of the third vertical tube 119. Hole 122 is equal in diameter to hole 107.

The first vertical tube 102 is positioned into a ballast 104 such that approximately $\frac{1}{6}$ of the length of the first vertical tube 102 (as shown in FIG. 8 dimension L7=L-L3) is secured in the ballast 104 and that the first vertical tube 102 and ballast 104 form an water tight seal. The ballast 104 can be formed from any suitable material such as concrete, metal or epoxy.

A series of holes 114 are placed around the circumference of the first vertical tube 102 between the ballast 104 and the lower endplate 112. This series of holes 114 allows outside water into the flooded reservoir/chamber 206 between the ballast or concrete 104 and the lower endplate 112. The holes are centered approximately $\frac{1}{3}$ of the distance (as shown in FIG. 8 dimension L8) from the vertical tube proximal end to the vertical tube distal end and said holes having a diameter approximately equal to $\frac{1}{6}$ the distance from the vertical tube proximal end to the vertical tube distal end.

The upper endplate 110 needs a minimum thickness of one quarter the diameter of the second vertical tube 106. The top of the upper endplate 110 should be flush with the top of the second vertical tube 106 and bonded around the entire circumference where the upper endplate 110 contacts the first vertical tube 102 and the second vertical tube 106. The bonding method can be welding, adhesive or other suitable mechanical means with the proper gasket.

The upper endplate 110 allows compressed air into the expansion chamber 108 formed by the first vertical tube 102 and the first vertical tube being essentially round and a second vertical tube 106 and the second vertical tube being essentially round and the expansion chamber 108 being bound by the lower endplate 112 mechanically fastened to the first vertical tube 102 distal from the proximal end. The upper endplate 110 is mechanically fastened to the first vertical tube 102 distal end. The mechanical fastening can be either accomplished by welding, adhesive or with a mechanical device with appropriate sealing mechanism such as a gasket. The compressed air enters the expansion chamber 108 from at least one air inlet hole but preferably two air inlets holes 116b and 116c that are 180 degrees apart, allowing the compressed air to flow evenly into the expansion chamber 108 to equalize the pressure. However, more air inlets can be incorporated into the design to ensure uniform air flow into expansion chamber 108. The compressed air fills the expansion chamber 108 which is the first chamber and then flows into the second vertical tube 106 through opening 118 at the proximal end of the second vertical tube 106 from expansion chamber 108 into second vertical tube 106 that forms chamber 132 specifically designed to form a super bubble 202 with minimal small bubbles. The opening 118 from expansion chamber 108 into second vertical tube 106 is the gap between the second vertical tube 106 proximal end and third vertical tube 119 distal end and that forms second chamber 131. The third vertical tube 119 has a lower flat radial edge 121 on the distal end which forms the lower portion of the opening 118 forming the second chamber 131. The upper portion of the opening 118 forming the second chamber 131 is formed from upper sharp beveled radial edge 124 of second vertical tube 106. The dimension of opening 118 is ten to thirty percent of the distance between the lower endplate 112 and the upper endplate 110 (as shown in FIG. 8 dimension L5). The distance from the lower endplate 112 to the upper endplate 110 in the vertical axial direction of the first vertical tube 102 (as shown in FIG. 8 dimension L2) and is ⅔ the distance represented by dimension L. Preferably that dimension of opening 118 is 15% of the distance (as shown in FIG. 8 dimension L7) from the lower endplate 112 to the upper endplate 110 in the vertical axial direction of the first vertical tube 102. The opening 118 and the outer surface of the second vertical tube 106 forms the upper portion of the opening that forms the second chamber 131. The lower flat radial edge 121 forms a lower boundary between the first vertical tube 102 and the second vertical tube 106 and is concentric to the second vertical tube 106 such that the interior and the exterior wall are perpendicular to the second vertical tube 106. The upper sharp beveled radial edge 124 forms the upper boundary of the opening 118 formed between expansion chamber 108 and main chamber 132 which forms the second chamber 131. The distance to the lower flat radial edge 121 that forms a lower boundary between the first vertical tube 102 (as shown in FIG. 8 dimension L5) from the lower plate is preferably ten percent of the distance from the lower endplate 112 to the upper endplate 110 in the vertical axial direction of the first vertical tube 102. The lower flat radial edge 121 of the opening of the third vertical tube 119 is from 0 to 45 degrees from perpendicular but preferably 0 degrees. The upper sharp beveled radial edge 124 of the second vertical tube 106 is 30 to 85 degrees from perpendicular but preferably 45 degrees and the angled surface faces towards the main chamber 131. The upper sharp radial edge 124 shears the compressed air mass as it moves into the second vertical tube 106 main chamber 132 where the super bubble 202 is formed before exiting out the upper open end of second vertical tube 107.

Still referring to FIG. 5, FIG. 6, FIG. 7, FIG. 8 FIG. 10 and FIG. 11 a metal pipe or plastic tube allows the compressed air to flow from the weighted air line 704 through a main air inlet 116a with a universal fitting to the inlets 116b and 116c and then into the expansion chamber 108 formed by the first vertical tube 102, second vertical tube 106, lower endplate 112 and upper endplate 110. Both air inlets 106b and 106c are bonded to the upper endplate 112. Two eyebolts 126 and 128 are installed 180 degrees apart through the upper endplate 110 to lift and lower the big bubble circulator 100 into the body of water.

Referring to FIG. 5, FIG. 6 FIG. 7, FIG. 8 FIG. 10 and FIG. 11 the flow through the big bubble circulator 100 is shown. The compressed air flows into the main air inlet 116a and through the piping or tubing to air inlets 116b and 116c that lead into the cavity or expansion chamber 108. The air enters through the upper endplate 110 and pipes 116b and 116c are 180 degrees apart. The cavity or expansion chamber 108 having a first vertical tube 102 central to the cavity or expansion chamber 108 and the first vertical tube 102 is connected to a reservoir/chamber 206 located below said lower endplate 112. The compressed air expands throughout the expansion chamber 108 forcing the water dam through the opening from expansion chamber into second vertical tube 106. The placement of the opening from expansion chamber into second vertical tube 118 above the lower endplate 112 is critical to assure equalized air pressure across the opening from expansion chamber into second vertical tube 106 to form a single super bubble 202 with minimum number of smaller bubbles. The lower flat radial edge 121 of the third vertical tube 119 forms the expansion chamber 108 length. The length of the second vertical tube 106 must be 40 to 90 percent the distance (as shown in FIG. 8 dimension L4) between the lower endplate 112 and the upper endplate 110. The opening 118 formed from the second vertical tube 106 upper sharp beveled radial edge 124 and the third vertical tube 119 Upper sharp beveled radial edge 124 should be 10 percent the distance (as shown in FIG. 8 dimension=L2−L6) between the lower endplate 112 and the upper endplate 110 above the lower flat radial edge 121. L6 equals 20 to 90% of the length L2.

Figure 10:
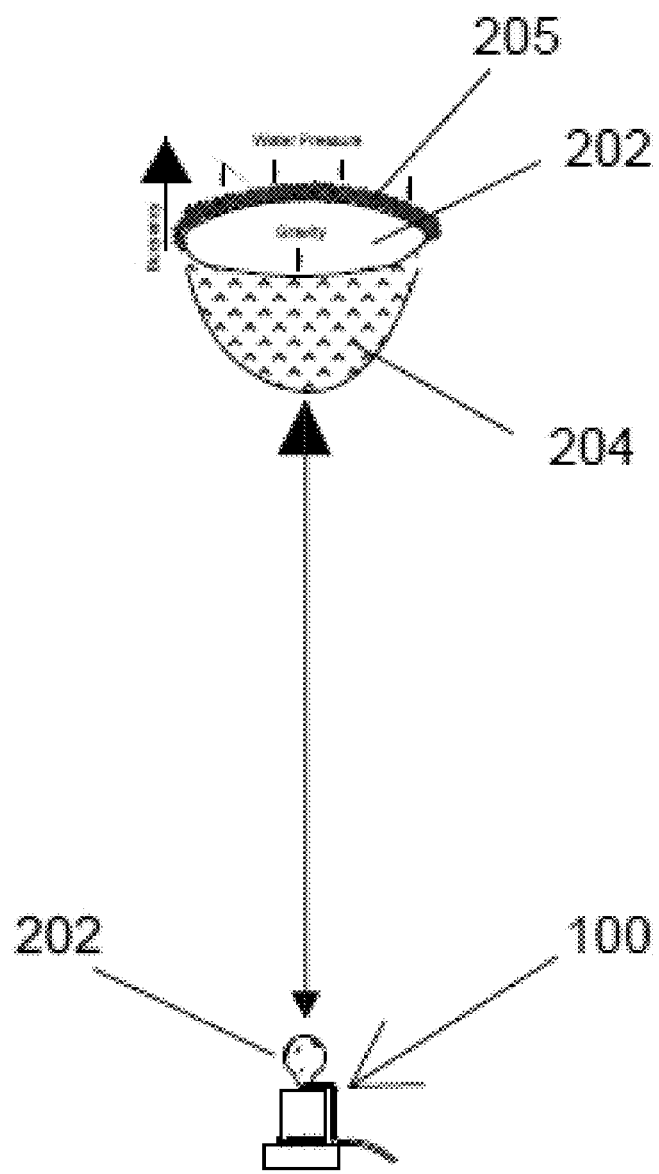
FIG. 10 depicts the forces acting on a super bubble released from the big bubble circulator shown in FIG. 5,4.

Referring to FIG. 10 the compressed air in the expansion chamber 108 pushes the water dam evenly through the opening from expansion chamber into second vertical tube 118 into the second vertical tube 106. The expanding compressed air lifts the water because the air mass is less dense and therefore more buoyant than the water surrounding the big bubble circulator 100. When the last of the water is being lifted out of the upper open end of second vertical tube 106, a super bubble 202 is forming in the second vertical tube 106. This movement causes the forming super bubble 202 to separate from the compressed air in the expansion chamber 108 evenly due to the upper sharp beveled radial edge of the opening from expansion chamber into second vertical tube 118. The moment the super bubble 202 separates from the compressed air, the bubble drafts water from the flooded reservoir/chamber 206 just below the lower endplate 112 up through the lower open end of the second vertical tube 106. The forming super bubble 202 due to its buoyancy moves quickly up and out of upper open end of second vertical tube 106. The previous sequence is repeated multiple times each second.

The pumping force driving the water flow is supplied by the weight of the volume of water displaced by bubbling air into a second vertical tube 106, and this energy is dissipated by the friction of the rising bubbles pipe entrance head, plus the frictional effects of the inner wall of second vertical tube 106 and the energy contained in the water when the bubble reaches the exit of the second vertical tube 106 at hole in upper end plate 110 which is related to the velocity of the bubble.

Referring to FIG. 10 and FIG. 11 the big bubble circulator 100 forms a super bubble 202. The super bubble 202 can be from 1 inch to 10 inches in diameter. The super bubble 202 rising in a body of water is dependent on several upward and downward forces. The downward forces include gravity and water being lifted 205 and water being drafted 204 by the super bubble 202. Gravity in this instance is nominal because bubbles have so little mass. The forces of lifted water being lifted 205 and drafted water 204 are dependent on the size of the super bubble 202 and the velocity at which the bubble is rising. The upward force of buoyancy for any bubble has to do with the volume of the water displaced versus the mass of the bubble. As the bubble rises, it increases in size due to reduced pressure on the bubble exterior from water pressure. The super bubble 202 can double in size which increases the velocity of the bubble in the water by up to four times. A one-millimeter fine bubble rises at approximately 1 foot per minute. A five-inch super bubble 202 rises at approximately 4 feet per minute. A nine-inch super bubble 202 rises at 9 feet per minute. The super bubble 202 illustrated in FIG. 10 starts out as a five-inch super bubble 202 at the big bubble circulator 100 and is a nine-inch super bubble 202 after rising 32 feet in water. A nine-inch super bubble 202 can lift and draft approximately two quarts of cold low oxygen water from the bottom of a body of water 316 to the surface of a body of water 318.

Figure 9:
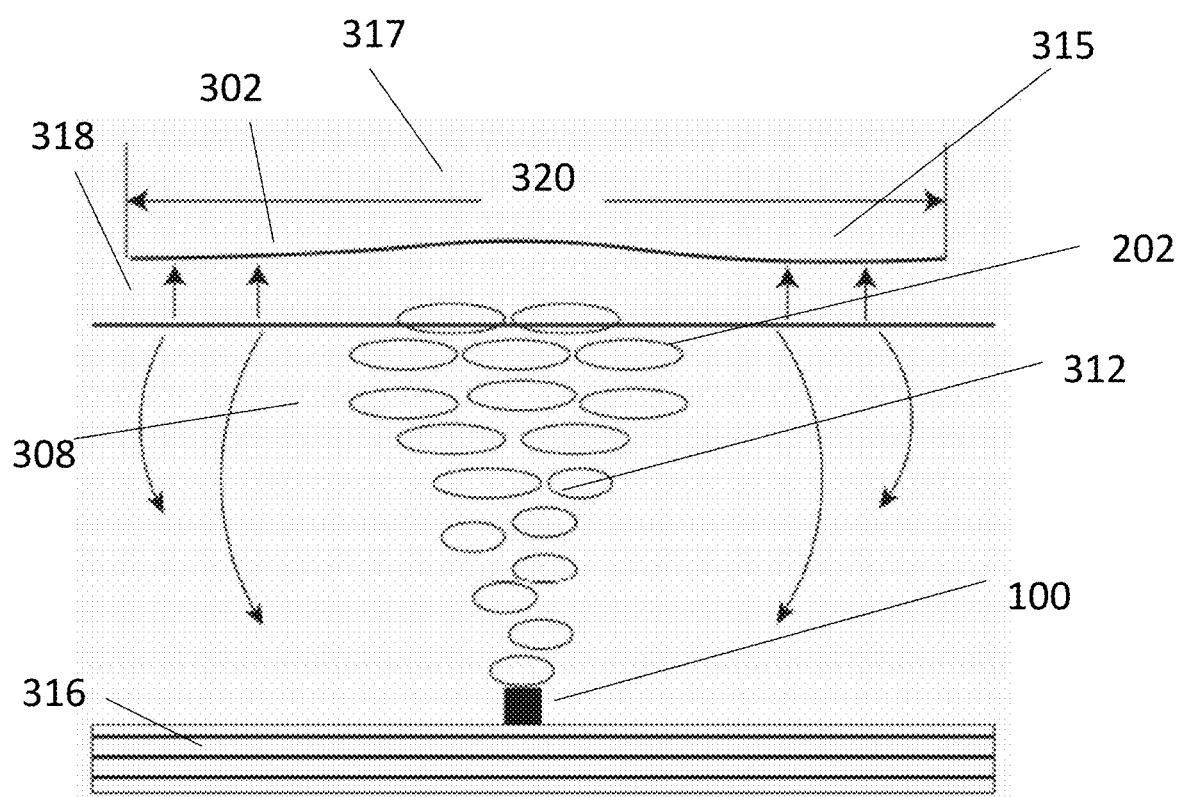
FIG. 9 shows the circulation pattern within a body of water for the big bubble circulator.

Referring to FIG. 9 shows the rotational pattern of a big bubble circulator 100 in a body of water. The big bubble circulator 100 in this embodiment produces approximately ten super bubbles 202 per second. This equates to more than 300 gallons per minute of cold low oxygen water from the bottom of a body of water 316 to the surface of body of water 318. When the fast-moving super bubble 202 breaks at the surface of body of water 318, the water being lifted 205 and drafted 204 by the super bubble 202 rises above the surface of body of water 318. The approximately six hundred or more super bubbles 202 breaking at the surface each minute creates a stream of churning low oxygen cold water that flows across the body of water up to 50 yards dimension 320 in all directions achieving maximum oxygen absorption or keeping ice from forming in freezing weather. The moving cold water which is heavier than the surface water eventually slows down and sinks back into the body of water 315. Continuously operating the big bubble circulator 100 creates a large oxygen rich vertical zone 312 like a slow spinning whirlpool or tornado due to the rotation of the earth.

Figure 12:
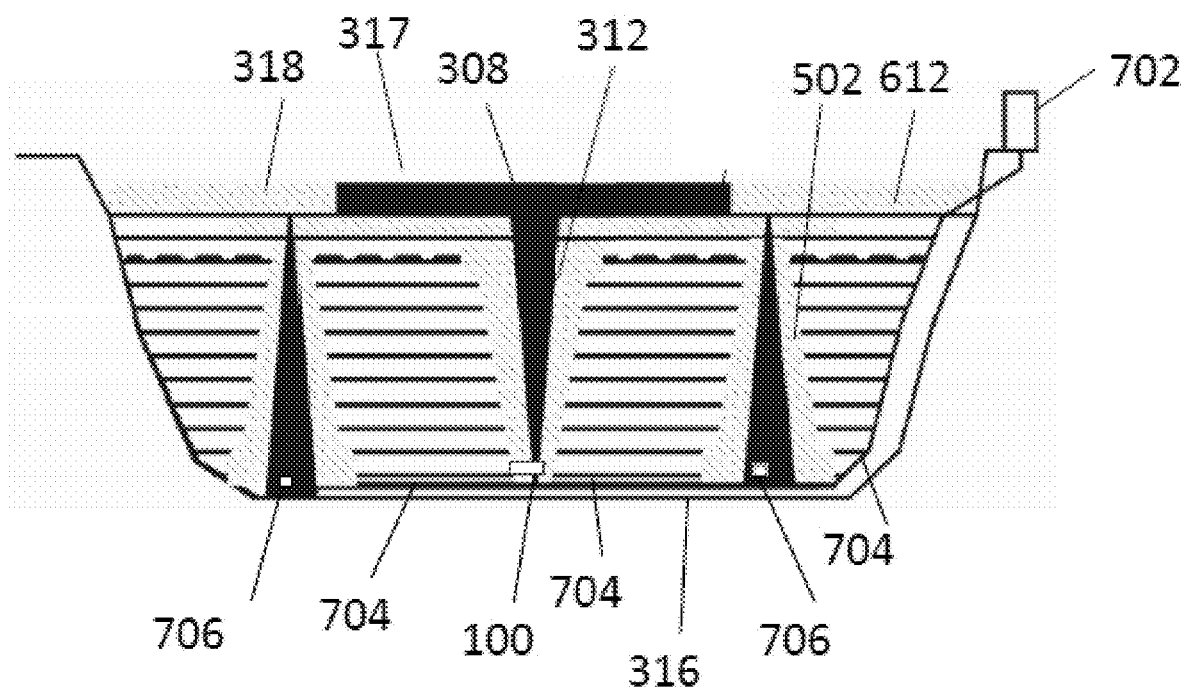
FIG. 12 shows a body of water incorporating the big bubble circulator into a new or existing small bubble aeration system.

Referring to FIG. 12 which shows a cross section of a body of water with a surface of body of water 318 and a bottom of body of water 316 where the big bubble circulator 100 has been incorporated within a new or existing fine bubble aeration system to create a vertical circulation zone 312 between two fine bubble diffusers 706. Also incorporated is a compressor station 702 including an electric or solar powered compressor and the piping necessary to supply regulated compressed air to the fine bubble diffusers 706 and big bubble circulator 100 located on the bottom of body of water 316. The regulated compressed air from the remote compressor station 702 flows through properly sized piping or weighted air line 704 to the diffusers 706 and big bubble circulator 100 on the bottom of body of water 316. Air compressor 702 can be selected from any suitable device. The preferred pumps include rocking piston pumps on deeper (>6 feet) lake or pond applications and a diaphragm pump for shallow applications.

Referring to FIG. 5, FIG. 6, FIG. 7, FIG. 8 and FIG. 11 an alternate embodiment for forming super bubbles at the bottom of a body of water can be fabricated as follows:

a. a first vertical tube 102 having a diameter and said diameter selected based on the size of super bubble desired and the diameter is selected from the dimensions from 3 to 48 inches. Preferably the diameter is 12 inches.

b. the first vertical tube 102 having a vertical tube wall formed by a vertical tube interior and a vertical tube exterior, a vertical tube proximal end and a vertical tube distal end;

c. the first vertical tube 102 having flood holes 114 penetrating the first vertical tube 102 wall such that the flood holes 114 are center approximately ⅓ of the distance from the first vertical tube 102 proximal end to the first vertical tube 102 distal end and the flood holes 114 having a diameter approximately equal to ⅙ the distance from the first vertical tube 102 proximal end to the first vertical tube 102 distal end.

d. the first vertical tube 102 being round and a round upper end plate 110 with an upper end plate hole 107 central to the upper end plate 110 and the upper end plate 110 attached to the first vertical tube 102 distal end such that the round upper end plate 110 with an upper end plate hole 107 central to the upper end plate 110 having a distal and proximal side and a round lower end plate 112 with a lower end plate hole 122 central to the lower end plate 112 and the lower end plate 112 having a distal and proximal side and the lower end plate attached to said first vertical tube 102 ⅓ the distance from the first vertical tube 102 proximal end to the first vertical tube 102 distal end from said proximal end such that a first vertical tube 102 cavity is formed from the first vertical tube 102 interior and a lower section is formed from below said lower end plate 110 proximal side;

e. the first vertical tube 102 is positioned in a ballast 104 such that said first vertical tube 102 length is ⅙ in said ballast and said ballast is sealed to said first vertical tube 102 such that a lower section is formed into a reservoir/chamber 206 bound by the ballast and the lower end plate and the flood holes are positioned to allow water to enter the reservoir/chamber 206;

f. said first vertical tube 102 having a second vertical tube 106 central to the first vertical tube 102 and the second vertical tube 106 having a proximal end and a distal end and the distal end connected to the upper end plate 110 such that the second vertical tube 106 aligns with the upper end plate hole 107 and the proximal end hangs from said upper end plate 110 into said first vertical tube expansion cavity 108 and said second vertical tube having a main chamber/bubble cavity 132 between the proximal and distal end of said second vertical tube 106;

g. the first vertical tube 102 having a third vertical tube 119 central to the first vertical tube 102 and said third vertical tube 119 connected to the lower end plate 112 and the third vertical tube 119 extending into said first vertical tube expansion cavity 108 and the third vertical tube 119 connecting the lower cavity 206 located on the proximal side of said lower end plate 112 and the third vertical tube 119 aligned with the second vertical tube hole 107 and the third vertical tube 112 distal end extending from said lower end plate 112 distal side into said first vertical tube expansion cavity 108 and the lower end plate hole is equal in diameter to the upper end plate hole.

h. said second vertical tube 106 hanging into said first tube expansion cavity 108 and said third vertical tube 119 extending into said first tube cavity 108 do not touch and form a slot between said second vertical tube 102 and said third vertical tube 119; and i. the round upper end plate 110 having at least one hole 116b to allow air to enter said first vertical tube expansion cavity 108.

j. said air being in communication with said first vertical tube 102 forming a first vertical tube expansion chamber/cavity 108 forming a first bubble 105 and said air entering said second vertical tube 106 having a second vertical tube bubble cavity main chamber 132 and a second air bubble is formed from said first bubble entering said a second vertical tube bubble cavity main chamber 132 by said a second vertical tube proximal end sharp radial beveled edge 124 cutting said first air bubble 105 forming said second air bubble 202a in said second vertical tube bubble cavity main chamber 132; and k. water in said lower cavity reservoir/chamber 206 is in communication with said third vertical tube cavity 207 and water in said lower cavity reservoir/chamber 206 and said slot and said water in said lower cavity adheres to said second air bubble 202a proximal end and water in said bubble cavity main chamber 132 adheres said second bubble distal end and said second air bubble 202a with said water from said third vertical tube cavity 207 adhered to said second bubble 202a proximal end and water from said bubble cavity main chamber 132 adhered to said second bubble 202a distal end exits said upper end plate hole 107 forming a super bubble 202 in said body of water.

A second embodiment of a method of forming a super bubble 202 in a body of water using the big bubble circulator 100 for forming super bubbles 202 in pond water at the bottom of a body of water wherein:

a. a first vertical tube 102 having a diameter and said diameter selected based on the size of super bubble desired and the diameter is selected from the dimensions from 3 to 48 inches. Preferably the diameter is 12 inches.

b. the first vertical tube 102 having a vertical tube wall formed by a vertical tube interior and a vertical tube exterior, a vertical tube proximal end and a vertical tube distal end;

c. the first vertical tube 102 having flood holes 114 penetrating the first vertical tube 102 wall such that the flood holes 114 are centered approximately ⅓ of the distance from the first vertical tube 102 proximal end to the first vertical tube 102 distal end and the flood holes 114 having a diameter approximately equal to ⅙ the distance from the first vertical tube 102 proximal end to the first vertical tube 102 distal end.

d. the first vertical tube 102 being round and a round upper end plate 110 with an upper end plate hole 107 central to the upper end plate 110 and the upper end plate 110 attached to the first vertical tube 102 distal end such that the round upper end plate 110 with an upper end plate hole 107 central to the upper end plate 110 having a distal and proximal side and a round lower end plate 112 with a lower end plate hole 122 central to the lower end plate 112 and the lower end plate 112 having a distal and proximal side and the lower end plate attached to said first vertical tube 102 ⅓ the distance from the first vertical tube 102 proximal end to the first vertical tube 102 distal end from said proximal end such that a first vertical tube 102 cavity is formed from the first vertical tube 102 interior and a lower section is formed from below said lower end plate 110 proximal side;

e. the first vertical tube 102 is positioned in a ballast 104 such that said first vertical tube 102 length is ⅙ in said ballast and said ballast is sealed to said first vertical tube 102 such that a lower section is formed into a reservoir/chamber 206 bound by the ballast and the lower end plate and the flood holes are positioned to allow water to enter the reservoir/chamber 206;

f. said first vertical tube 102 having a second vertical tube 106 central to the first vertical tube 102 and the second vertical tube 106 having a proximal end and a distal end and the distal end connected to the upper end plate 110 such that the second vertical tube 106 aligns with the upper end plate hole 107 and the proximal end hangs from said upper end plate 110 into said first vertical tube expansion cavity 108 and said second vertical tube having a main chamber/bubble cavity 132 between the proximal and distal end of said second vertical tube 106;

g. the first vertical tube 102 having a third vertical tube 119 central to the first vertical tube 102 and said third vertical tube 119 connected to the lower end plate 112 and the third vertical tube 119 extending into said first vertical tube expansion cavity 108 and the third vertical tube 119 connecting the lower cavity 206 located on the proximal side of said lower end plate 112 and the third vertical tube 119 aligned with the second vertical tube hole 107 and the third vertical tube 112 distal end extending from said lower end plate 112 distal side into said first vertical tube expansion cavity 108 and the lower end plate hole is equal in diameter to the upper end plate hole.

h. said second vertical tube 106 hanging into said first tube expansion cavity 108 and said third vertical tube 119 extending into said first tube cavity 108 do not touch and form a slot between said second vertical tube 102 and said third vertical tube 119; and i. the round upper end plate 110 having at least two holes 116b and 116c to allow air to enter said first vertical tube expansion cavity 108.

j. wherein air is injected into at least two holes 116b and 116c of the round upper end plate 110 and the air forms a first bubble 105 in the expansion chamber 108 and said first bubble 105 enters said second chamber 131 and moves from said chamber 131 to the bubble cavity/main chamber 132 and the second vertical tube proximal end sharp radial beveled edge 124 cuts said first bubble 105 forming a second bubble 202a and said second bubble 202a pushes the water up said bubble cavity/main chamber 132 and the water in said bubble cavity/main chamber 132 attaches to the top of said second bubble 202a and the water from said second chamber 131 attaches to the bottom of said second bubble and said second bubble 202a and said second bubble floats 202a up the bubble cavity and into the body of water.

Since many modifications, variations, and changes in detail can be made to the described embodiments of the invention, it is intended that all matters in the foregoing description and shown in the accompanying drawings be interpreted as illustrative and not in a limiting sense. Furthermore, it is understood that any of the features presented in the embodiments may be integrated into any of the other embodiments unless explicitly stated otherwise. The scope of the invention should be determined by the appended claims and their legal equivalents.

In addition, the present invention has been described with reference to embodiments, it should be noted and understood that various modifications and variations can be crafted by those skilled in the art without departing from the scope and spirit of the invention. Accordingly, the foregoing disclosure should be interpreted as illustrative only and is not to be interpreted in a limiting sense. Further it is intended that any other embodiments of the present invention that result from any changes in application or method of use or operation, method of manufacture, shape, size, or materials which are not specified within the detailed written description or illustrations contained herein are considered within the scope of the present invention.

Insofar as the description above and the accompanying drawings disclose any additional subject matter that is not within the scope of the claims below, the inventions are not dedicated to the public and the right to file one or more applications to claim such additional inventions is reserved.

Although very narrow claims are presented herein, it should be recognized that the scope of this invention is much broader than presented by the claim. It is intended that broader claims will be submitted in an application that claims the benefit of priority from this application.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A device for forming a super bubble in a body of water wherein said device is located in said body of water such that said device is submerged in said body of water and said device is connected to an air supply and said super bubble having a diameter of at least 1 inch and a maximum of 10 inches and said super bubble capable of rising in the direction of the surface of said body of water and said device comprising:
   a. a first vertical tube;
   b. said first vertical tube having a vertical tube diameter;
   c. said first vertical tube having a first vertical tube wall formed by a first vertical tube interior and a first vertical tube exterior, a first vertical tube proximal end and a first vertical tube distal end;
   d. said first vertical tube distal end is facing said surface of said body of water;
   e. said first vertical tube having flood holes penetrating said first vertical tube wall such that said flood holes are centered approximately ⅓ of the distance from said first vertical tube proximal end to said first vertical tube distal end and said flood holes having a diameter approximately equal to ⅙ the distance from said first vertical tube proximal end to said first vertical tube distal end;
   f. said first vertical tube having a round upper end plate with a round upper end plate hole central to said round upper end plate and said round upper end plate attached to said first vertical tube distal end such that said round upper end plate with said round upper end plate hole central to said round upper end plate and said round upper end plate having an round upper end plate distal side and an round upper end plate proximal side and a round lower end plate with a round lower end plate hole central to said round lower end plate and said round lower end plate having a round lower end plate distal side and a round lower end plate proximal side and said round lower end plate attached to said first vertical tube distal end ⅓ the distance from said first vertical tube proximal end to said first vertical tube distal end and said lower end plate is positioned from said first vertical tube proximal end such that such that a first vertical tube cavity is formed from said first vertical tube interior and a lower cavity is formed below said round lower end plate proximal side and said lower cavity is in communication with water entering from said flood holes;
   g. said round upper end plate hole diameter is smaller than said first vertical tube diameter;
   h. said first vertical tube is positioned in a ballast such that ¹⁄₁₆ of said first vertical tube length is in said ballast and said ballast is sealed to said first vertical tube such that said lower section is formed into a lower cavity bound by said ballast and said lower end plate and said flood holes are positioned to allow water to enter said lower cavity;
   i. said first vertical tube having a second vertical tube central to said first vertical tube and said second vertical tube having a proximal end and a distal end and said second vertical tube distal end connected to said round upper end plate such that said second vertical tube aligns with said round upper end plate hole and said second vertical tube proximal end hanging from said round upper end plate into said first vertical tube cavity and said second vertical tube having a bubble cavity between said proximal and distal end of said second vertical tube;
   j. said first vertical tube having a third vertical tube central to said first vertical tube and said third vertical tube connected to said round lower end plate and said third vertical tube extending into said first vertical tube cavity and said third vertical tube connecting said lower cavity located on the proximal side of said round lower end plate and said third vertical tube aligned with said second vertical tube hole and said third vertical tube distal end extending from said round lower end plate distal side into said first vertical tube cavity such that said third vertical tube and said second vertical tube form a slot;
   k. said third vertical tube forming a passage allowing water from said lower cavity to be in communication with said slot;
   l. said second vertical tube hanging into said first tube cavity and said third vertical tube extending into said first tube cavity and said second vertical tube and said third vertical tube do not touch and forms said slot between said second vertical tube and said third vertical tube which forms a second cavity;

m. said second vertical tube proximal end having a second vertical tube proximal end sharp radial beveled edge and said third vertical tube distal end having a third vertical tube distal end flat edge; and n. said round upper end plate having at least one hole to allow air to enter said first vertical tube cavity and said air fills said first tube cavity forming a first cavity bubble and said first cavity bubble fills said second cavity forming a second cavity bubble and said sharp radial beveled edge cuts said second cavity bubble and forms said super bubble.

2. The device of claim 1 wherein said slot between said second vertical tube above the lower endplate is ten to thirty percent of the distance between said lower endplate and said upper endplate.

3. The device of claim 1 wherein said second vertical tube proximal end sharp radial beveled edge is a beveled angle and said beveled angle is selected from the angles between 30 to 85 degrees from perpendicular and said sharp edge faces said second vertical tube bubble cavity.

4. The device of claim 1 wherein said second vertical tube proximal end sharp radial beveled edge is a beveled angle of 45 degrees.

5. The device of claim 1 wherein said third vertical tube proximal end edge is a flat radial edge and said flat radial edge angle is selected from the angles between 0 to 45 degrees from perpendicular.

6. The device of claim 1 wherein said third vertical tube proximal end flat radial edge is a beveled angle of 0 degrees.

7. The device of claim 1 wherein said slot between said second vertical tube above the lower endplate is ten to thirty percent of the distance between said lower endplate and said upper endplate.

8. The device of claim 1 wherein said second vertical tube proximal end sharp radial beveled edge is a beveled angle and said beveled angle is selected from the angles between 30 to 85 degrees from perpendicular and said sharp edge faces said second vertical tube bubble cavity.

9. The device of claim 1 wherein said second vertical tube proximal end sharp radial beveled edge is a beveled angle of 45 degrees.

10. The device of claim 1 wherein said third vertical tube proximal end edge is a flat radial edge and said flat radial edge angle is selected from the angles between 0 to 45 degrees from perpendicular.

11. The device of claim 1 wherein said third vertical tube proximal end flat radial edge is a beveled angle of 0 degrees.

12. A method of forming a super bubble in pond a body of water using the device of claim 1 wherein:

a. said air being in communication with said first vertical tube cavity forming a first bubble and said first bubble entering said second vertical tube forming a second bubble in said second vertical tube bubble cavity and a second air bubble is formed from said first bubble entering said a second vertical tube bubble cavity by said a second vertical tube proximal end sharp radial beveled edge cutting said first air bubble forming said second air bubble in said second vertical tube bubble cavity; and b. water in said lower cavity is in communication with said third vertical tube and said slot and said water in said lower cavity adheres to said second bubble proximal end and water in said bubble cavity adheres said second bubble distal end and said second bubble with said water from said lower cavity adhered to said second bubble proximal end and water in said bubble cavity adhered to said second bubble distal end exits said upper end plate hole forming a super bubble in said pond body of water.

13. A device for forming a super bubble in a body of water and said super bubble having a diameter of at least 1 inch and a maximum of 10 inches and said super bubble capable of rising in the direction of the surface of said body of water using a big bubble circulator for forming said super bubble in said body of water and said big bubble circulator comprising:

a. a first vertical tube;

b. said first vertical tube having a vertical tube diameter;

c. said first vertical tube having a vertical tube wall formed by a vertical tube interior and a vertical tube exterior, a vertical tube proximal end and a vertical tube distal end;

d. said first vertical tube distal end is facing the surface of said body of water;

e. said first vertical tube having flood holes penetrating said vertical tube wall such that said flood holes are centered approximately ⅓ of the distance from said vertical tube proximal end to said vertical tube distal end and said flood holes having a diameter approximately equal to ⅙ the distance from said vertical tube proximal end to said vertical tube distal end;

f. said first vertical tube having a round upper end plate with an upper end plate hole central to said round upper end plate and said round upper end plate attached to said first vertical tube distal end such that said round upper end plate with said upper end plate hole central to said round upper end plate and said round upper end plate having a round upper end plate distal side and round upper end plate proximal side and a round lower end plate with a lower end plate hole central to said round lower end plate and said round lower end plate having a round lower end plate distal side and round lower end plate proximal side and said round lower end plate attached to said vertical tube distal end ⅓ the distance from said vertical tube proximal end to said vertical tube distal end from said vertical tube proximal end such that a first vertical tube cavity is formed from said vertical tube interior and a lower cavity is formed below said round lower end plate proximal side and said lower cavity is in communication with water entering from said flood holes;

g. said upper end plate hole diameter is smaller than said vertical tube diameter;

h. said first vertical tube proximal end is positioned in a ballast such that said first vertical tube length is ⅙ in said ballast and said ballast is sealed to said first vertical tube such that said lower section is formed into a lower cavity bound by said ballast and said lower end plate and said flood holes are positioned to allow water to enter said lower cavity;

i. said first vertical tube having a second vertical tube central to said first vertical tube and said second vertical tube having a proximal end and a distal end and said distal end connected to said round upper end plate such that said second vertical tube aligns with said upper end plate hole and said second vertical tube proximal end hanging from said round upper end plate into said first vertical tube cavity and said second vertical tube having a super bubble cavity between said proximal and distal end of said second vertical tube;

j. said first vertical tube having a third vertical tube central to said first vertical tube and said third vertical tube connected to said round lower end plate and said third vertical tube extending into said first vertical tube cavity and said third vertical tube connecting said lower cavity located on the proximal side of said round lower end plate and said third vertical tube aligned with said second vertical tube hole and said third vertical tube distal end extending from said round lower end plate distal side into said first vertical tube cavity such that said third vertical tube and said second vertical tube forms a second cavity;

k. said third vertical tube forming a passage allowing water from said lower cavity to be in communication with said second cavity;

l. said second vertical tube hanging into said first tube cavity and said third vertical tube extending into said first tube cavity do not touch and forms a said second cavity between said second vertical tube and said third vertical tube which forms a said second cavity;

m. said second vertical tube proximal end having a second vertical tube proximal end sharp radial beveled edge and said third vertical tube distal end having a third vertical tube distal end flat edge; and n. said round upper end plate having at least two holes to allow air to enter said first vertical tube cavity.

14. A method of forming super bubbles in a body of water using said big bubble circulator of claim 13 wherein:

a. said big bubble circulator is at the bottom of said body of water and air is injected into at least two air inlet holes in said upper end plate and the air forms a first bubble in said first vertical tube cavity and said first bubble enters said second cavity and moves from said second cavity to the bubble cavity and the second vertical tube proximal end sharp radial beveled edge cuts said first bubble forming a super bubble and said super bubble pushes the water up said bubble cavity and the water in said bubble cavity attaches to the top of said super bubble and the water from said second cavity attaches to the bottom of said second bubble and said super bubble floats up the bubble cavity and into the said body of water.

\* \* \* \* \*